R. E. HELLMUND.
INDUCTION MOTOR.
APPLICATION FILED JAN. 7, 1911.
1,080,061. Patented Dec. 2, 1913.
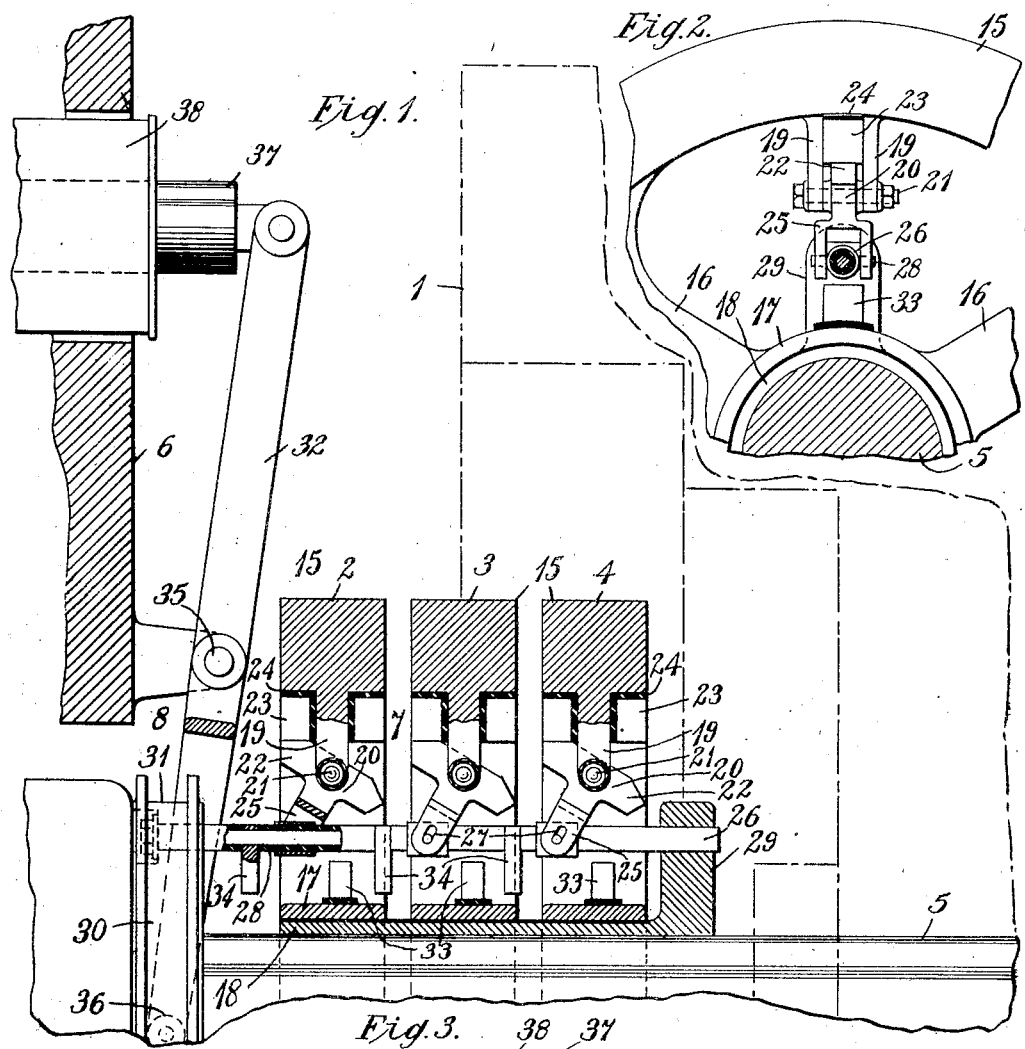
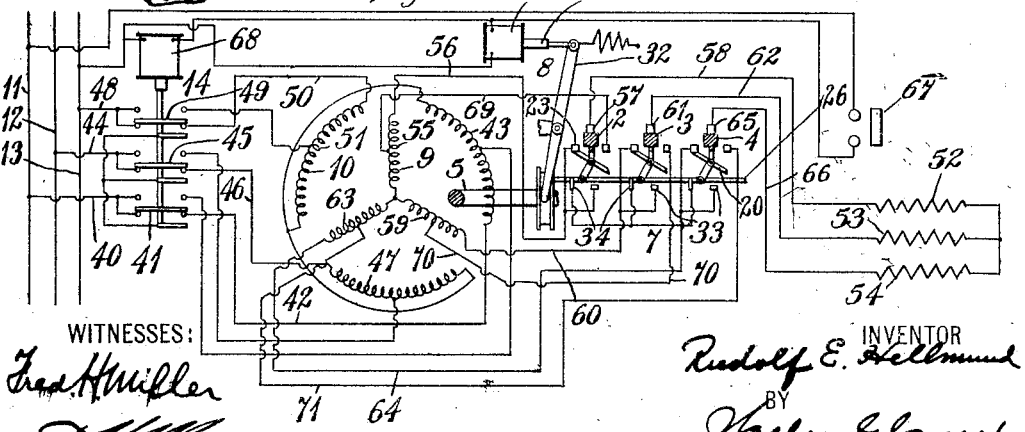
WITNESSES:
Fred H. Miller
D. H. Mace
INVENTOR
Rudolf E. Hellmund
BY
Wiley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

INDUCTION-MOTOR.

1,080,061.   Specification of Letters Patent.   Patented Dec. 2, 1913.

Application filed January 7, 1911. Serial No. 601,378.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Induction-Motors, of which the following is a specification.

My invention relates to dynamo-electric machines of the wound-rotor induction type, and it has special reference to switching devices which are adapted to arrange the circuit connections of the rotor winding for economical multi-speed operation.

The object of my invention is to provide a simple and compact device of the above-indicated character which shall be adapted to reduce the longitudinal space commonly occupied by a plurality of current collectors or slip rings, and to minimize the usual number of sliding contact members.

In the prior art, when induction motors having wound rotors and external resistances have been adapted for two speed operation, it has been common to provide six slip rings upon the motor shaft, whereby the necessary rotor circuit connections could be established to change the number of secondary poles to correspond to the change of primary poles and thus obtain a new economical operating speed. The disadvantages of this means of adjusting the rotor connections reside in the fact that the slip rings occupy a very considerable longitudinal space and also involve an undesirable number of sliding contact members.

In railway locomotives in which the distance between wheels is limited by a standard track gage, the maximum allowable longitudinal length of motor is fixed. Furthermore, the general tendency of railway work is toward larger and more powerful locomotives, which necessitates increasing the size and capacity of the driving motors. Hence, the space between the wheels must be utilized to the fullest extent for driving units and, it is, therefore, of great importance to reduce to a minimum the longitudinal space taken up by slip rings.

According to my invention, I accomplish the necessary circuit changes through three slip rings and an externally actuated switching device which is located within the revolving part and is stationary relative to the rotor member.

My invention is illustrated in the accompanying drawings, of which—

Figure 1 is a view, partially in side elevation and partially in vertical section, of a portion of a dynamo-electric machine embodying my invention. Fig. 2 is a fragmentary view, partially in end elevation and partially in vertical section, of the switching device shown in Fig. 1, and Fig. 3 is a diagrammatic view of a control system which embodies my invention.

Referring to the drawings in detail, the device herein shown comprises a secondary member or rotor 1, a plurality of current collectors or slip rings 2, 3 and 4, a shaft 5, a motor frame 6, a switching device 7 and an operating mechanism 8. The rotor 1 is of well known construction and is supported upon the shaft 5 and provided with a secondary star-connected winding 9 which is adapted to be connected to the slip rings 2, 3 and 4 through the agency of the switching device 7, as will be hereinafter described. The stator (not shown) is also of well known construction and is provided with a star-connected primary winding 10 which is adapted to receive energy from a supply circuit 11, 12, and 13, through a switching device 14 which is adapted to change the number of primary magnetic poles in an old and familiar manner.

The slip rings 2, 3 and 4 are of like construction and each comprises a ring 15, supporting radial arms 16 and a hub member 17. Each of the slip rings 2, 3 and 4 is tightly fitted to, and insulated from, a sleeve or bushing 18 which surrounds the shaft 5 and is rigidly associated therewith. Furthermore, each slip ring is provided with integral inwardly projecting lugs 19, between which a T-shaped movable contact member 20 is pivotally mounted upon a pin 21. The ends of the laterally projecting arms 22 of the contact member 20 are beveled off to coöperate with stationary contact terminals 23 which are secured to the inside of the ring 15 at the sides of the integral projections 19, and are suitably insulated therefrom by insulating barriers 24. The stem portion 25 of each T-shaped contact member 20 is bifurcated and is operatively associated with a longitudinally disposed rod 26 by means of a pin-and-slot connection 27, said contact members being insulated from the rod 26 by means of an insulating sleeve 28.

The inner end of the rod 26 is loosely fitted into a projecting portion 29 which forms an integral part of the bushing 18, and its outer end is rigidly secured to a collar member 30 which surrounds the shaft 5 and is loosely keyed thereto. The collar 30 is provided with a peripheral groove or channel 31 into which the lower ends of an operating lever 32 are suitably fitted for the purpose of effecting longitudinal movement of the rod 26 whereby the switching device 7 is actuated. The switching device 7 is also provided with a plurality of stationary contact terminals 33 which are rigidly secured to, and insulated from, the hub portions 17 of the slip rings, and with movable contact members 34 which are supported by and electrically connected to the rod 26, and are adapted to coöperate with the stationary contact terminals 33.

The operating lever 32 is pivotally mounted upon a pin 35 and its lower end is bifurcated, the end of each arm carrying a pivotally mounted roller 36 which is adapted to engage the sides of the peripheral channel 31, as will be readily understood. Thus, it is evident that the collar 30 may be moved longitudinally on the shaft 5 with no appreciable friction while the motor is running. The upper end of the operating lever 32 is pivotally connected to a movable core member 37 of an electro-magnet 38 which is suitably mounted upon the motor frame 6. It will be understood that any other suitable device for actuating the rod 26 may be employed and that hand operation thereof may be effected if desired.

Assuming the motor to be running and the circuit connections and various parts of the apparatus to occupy the positions shown, the operation is as follows: Energy is supplied to the primary windings of the motor, from supply circuit conductor 11, through conductor 40, switch member 41 and conductor 42 to the outer tap of primary winding 43; from supply circuit conductor 12, through conductor 44, switch member 45, and conductor 46 to the outer tap of primary winding 47; and from supply circuit conductor 13, through conductor 48, switch member 49 and conductor 50 to the outer tap of primary winding 51. According to well known principles, a voltage is induced in the secondary rotor winding 9 and energy is supplied to external resistance sections 52, 53 and 54, from the outer tap of secondary winding 55, through conductor 56, stationary contact terminal 23, movable contact member 20, slip ring 2, stationary brush 57 and conductor 58 to resistance section 52; from the outer tap of secondary winding 59, through conductor 60, stationary contact terminal 23, movable contact member 20, slip ring 3, stationary brush 61 and conductor 62 to resistance section 53; and from the outer tap of secondary winding 63, through conductor 64, stationary contact terminal 23, movable contact member 20, slip ring 4, stationary brush 65 and conductor 66 to resistance section 54.

Those skilled in the art will readily understand that the circuit connections of both the primary and secondary windings are arranged for the lowest operating speed, which may be increased to an economical running speed by gradually cutting out the resistance sections 52, 53 and 54. If it is then desired to adjust the motor for higher speeds, the switching device 67 is closed, thereby energizing electro-magnets 68 and 38 and causing the switching devices 14 and 7 to be actuated. As the switching device 14 is raised into engagement with its upper contact terminals, circuits are established whereby energy is supplied from the supply circuit conductors 11, 12 and 13 through the switching device 14 to the middle taps of the primary windings 43, 47 and 51, while the outer taps of these windings are interconnected, thereby halving the number of primary magnetic poles in accordance with the usual practice. The electro-magnet 38 effects a concurrent operation of the switching device 7 through the agency of the operating lever 32, collar 30 and rod 26, whereby the outer taps of the secondary windings 55, 59 and 63 are interconnected through conductors 56, 60 and 64, contact members 33 and 34 and rod 26 and energy is supplied to the resistance sections 52, 53 and 54, from the middle tap of secondary winding 55, through conductor 69, stationary contact terminal 23, movable contact member 20, slip ring 2, stationary brush 57, and conductor 58 to the resistance section 52; from the middle tap of secondary winding 59, through conductor 70, stationary contact terminal 23, movable contact member 20, slip ring 3, stationary brush 61 and conductor 62 to the resistance section 53; and from the middle tap of secondary winding 63 through conductor 71, stationary contact terminal 23, movable contact member 20, slip ring 4, stationary brush 65, and conductor 66 to the resistance section 54. It will, therefore, be evident, to those skilled in the art, that the number of secondary magnetic poles is halved to correspond to the reduction in primary magnetic poles hereinbefore set forth and, hence, a higher economical operating speed of the motor is attained.

Particular attention is directed to the disposition of the switching device 7 within the slip rings and to the economy of longitudinal space effected thereby. It is evident that many modifications in the structural details and in the arrangement and location of parts may be effected without departing from the spirit and scope of my invention, and I desire that only such limitations shall be imposed as are indicated in the appended claims.

I claim as my invention:

1. In a dynamo electric machine, the combination with a rotatable member, a winding therefor having two sets of taps, and current-collecting rings associated with said rotatable member, of a switching device that is operative independently of the movement of said rotatable member and serves to connect said rings to either of said sets of winding taps and to inter-connect the taps of one of the sets.

2. In an induction motor, the combination with a secondary rotor having a polyphase winding adapted to produce different numbers of magnetic poles, and a plurality of slip rings, of means embodied in said rotor for adjusting the circuit connections of said winding to change the number of rotor magnetic poles, and mechanical means independent of said rotor for operating said first-named means.

3. In an induction motor, the combination with a secondary rotor having a polyphase winding adapted to produce different numbers of magnetic poles, and a plurality of slip rings, of a switching device embodied in said rotor and mechanically associated with said slip rings for adjusting the circuit connections of said winding to change the number of rotor magnetic poles, and means for operating said switching device.

4. In an electric motor, the combination with a rotatable member having a polyphase winding, and a plurality of current-collectors insulated from said member, of a pivotally mounted contact member associated with each collector, a plurality of contact terminals to coöperate with said contact members, a rod disposed within said collectors and associated with said pivotally mounted contact members, a plurality of sets of coöperating stationary and movable contact members associated respectively with said collectors and said rod, and mechanical means for actuating said rod independently of the rotation of said rotatable member.

5. In an induction motor, the combination with a rotatably mounted secondary winding adapted to produce different numbers of magnetic poles, and a plurality of collector rings, of a switching device disposed within said collector rings for adjusting the circuit connections of said secondary winding to effect a change in the number of magnetic poles, and means independent of the rotation of said secondary winding for actuating said s         ce.

6. In an induction moto$_\cdot$, the combination with a rotor having a polyphase winding, and a plurality of slip rings, of a switching device associated with said rotor and disposed within said slip rings, said switching device comprising a movable contact member pivotally mounted on each ring, a plurality of stationary contact terminals to coöperate therewith, an additional pair of coöperating stationary and movable contact members for each slip ring, and mechanical means associated with said movable members for actuating the same, and means independent of the rotational movement of said rotor for imparting movement to said mechanical means.

7. In an induction motor, the combination with a rotatably mounted secondary star-connected winding, and three slip rings, of a switching device associated with and disposed within said slip rings and normally adapted to severally connect said rings to the outer taps of said secondary winding, and means which is stationary relative to said rotatable secondary winding for actuating said switching device to severally connect said slip rings to the middle taps of said secondary winding and concurrently to inter-connect said outer taps of said secondary winding.

In testimony whereof, I have hereunto subscribed my name this 30th day of Dec. 1910.

RUDOLF E. HELLMUND.

Witnesses:
M. DAPPRICH,
B. B. HINES.